US012775394B2

(12) United States Patent
Muchherla et al.

(10) Patent No.: US 12,775,394 B2
(45) **Date of Patent: *Oct. 27, 2026**

(54) CODE RATE AS FUNCTION OF LOGICAL SATURATION

(71) Applicant: MICRON TECHNOLOGY, INC., Boise, ID (US)

(72) Inventors: Kishore Kumar Muchherla, San Jose, CA (US); Mustafa N. Kaynak, San Diego, CA (US); Jonathan S. Parry, Boise, ID (US); Sivagnanam Parthasarathy, Carlsbad, CA (US); Akira Goda, Tokyo (JP)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/811,658

(22) Filed: Aug. 21, 2024

(65) Prior Publication Data

US 2024/0411459 A1 Dec. 12, 2024

Related U.S. Application Data

(63) Continuation of application No. 17/890,082, filed on Aug. 17, 2022, now Pat. No. 12,099,725.

(51) Int. Cl.
*G06F 3/06* (2006.01)

(52) U.S. Cl.
CPC .......... *G06F 3/0619* (2013.01); *G06F 3/0629* (2013.01); *G06F 3/0679* (2013.01)

(58) Field of Classification Search
CPC .... G06F 3/0619; G06F 3/0629; G06F 3/0679; G06F 3/0608; G06F 3/0661
See application file for complete search history.

(56) References Cited

U.S. PATENT DOCUMENTS

| | | | |
|---|---|---|---|
| 2012/0311293 | A1 | 12/2012 | Nemazie et al. |
| 2013/0124945 | A1 | 5/2013 | Hu et al. |
| 2013/0145238 | A1 | 6/2013 | Alhussien et al. |
| 2019/0065080 | A1 | 2/2019 | Tanpairoj et al. |
| 2019/0171564 | A1 | 6/2019 | Bahirat |
| 2020/0259880 | A1 | 8/2020 | Xiong et al. |
| 2021/0011767 | A1 | 1/2021 | Luo et al. |
| 2023/0106125 | A1 | 4/2023 | Chung et al. |

*Primary Examiner* — Michael Krofcheck
(74) *Attorney, Agent, or Firm* — Lowenstein Sandler LLP

(57) ABSTRACT

A method includes determining a logical saturation of a memory device in a memory sub-system and adjusting a code rate of the memory device based on the logical saturation, wherein the code rate represents a ratio of user data to a combination of the user data and error correction data.

20 Claims, 6 Drawing Sheets

CODE RATE AS FUNCTION OF LOGICAL SATURATION

RELATED APPLICATIONS

The present application is a continuation of application Ser. No. 17/890,082, filed Aug. 17, 2022, entitled "CODE RATE AS FUNCTION OF LOGICAL SATURATION" which is incorporated by reference herein.

TECHNICAL FIELD

Embodiments of the disclosure relate generally to memory sub-systems, and more specifically, relate to code rate as function of logic saturation.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various implementations of the disclosure.

DETAILED DESCRIPTION

Figure 1:
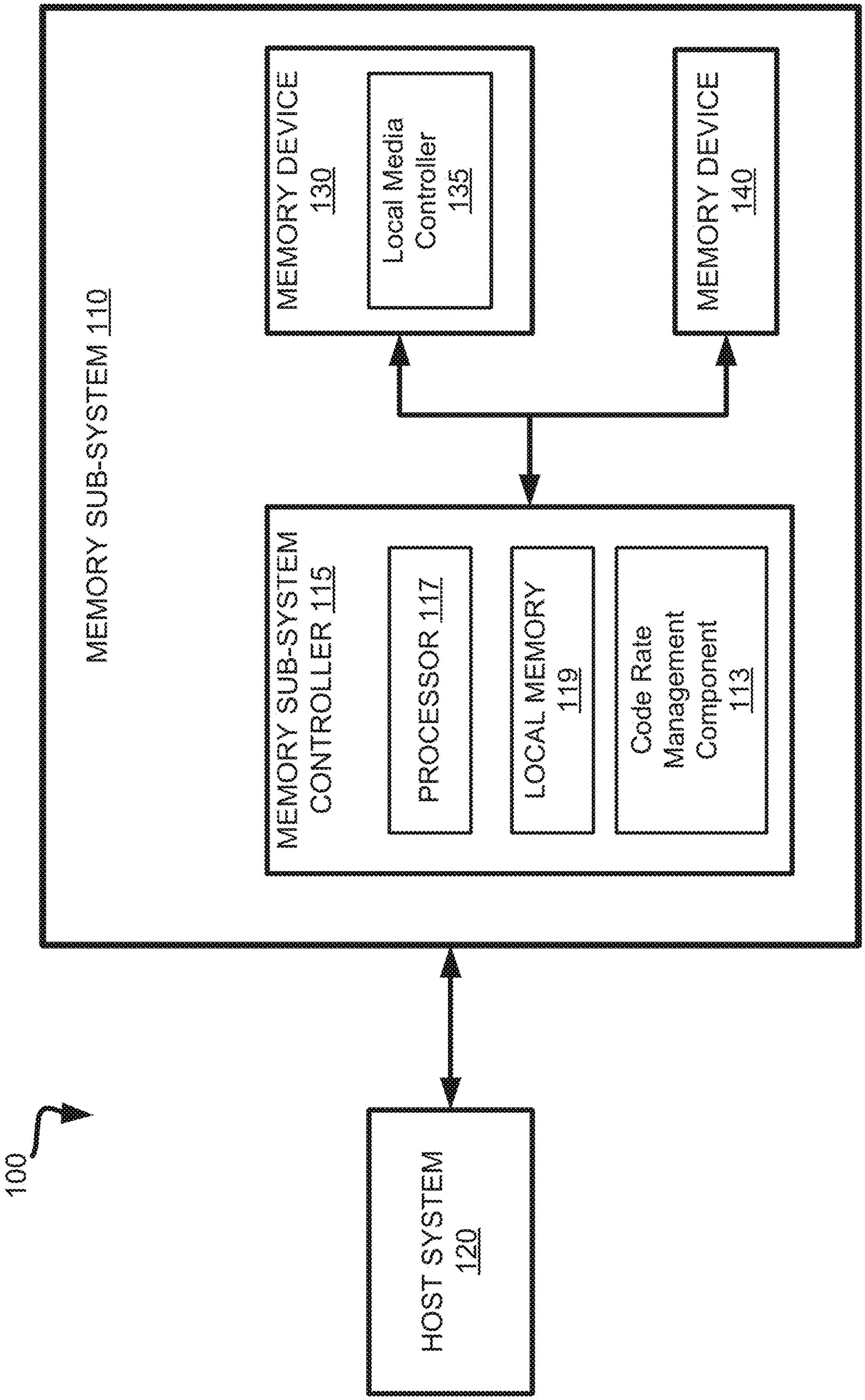
FIG. 1 illustrates an example computing environment that includes a memory sub-system in accordance with some embodiments of the present disclosure.

Aspects of the present disclosure are directed to adjusting code rate based on logic saturation. A memory sub-system can be a storage device, a memory module, or a hybrid of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. For example, NAND memory, such as 3D flash NAND memory, offers storage in the form of compact, high density configurations. A non-volatile memory device is a package of one or more dice, each including one or more planes. For some types of non-volatile memory devices (e.g., NAND memory), each plane includes of a set of physical blocks. Each block includes of a set of pages. Each page includes of a set of memory cells ("cells"). A cell is an electronic circuit that stores information. A block hereinafter refers to a unit of the memory device used to store data and can include a group of memory cells, a word line group, a word line, or individual memory cells. Each block can include a number of sub-blocks, where each sub-block is defined by an associated pillar (e.g., a vertical conductive trace) extending from a shared bit line. Memory pages (also referred to herein as "pages") store one or more bits of binary data corresponding to data received from the host system.

For example, a memory device can include single-level cells (SLCs) that each store one bit of data, multi-level cells (MLCs) that each store two bits of data, triple-level cells (TLCs) that each store three bits of data and/or quad-level cells (QLCs) that each store four bits of data. Each type of memory cell (e.g., SLCs, MLCs, TLCs and QLCs) can exhibit different characteristics and advantages. For example, an SLC can have a lower read latency (e.g., how long it takes for data stored at the SLC to be read), a faster programming time (e.g., how long it takes to program data received from the host system to the cell for storage) and a greater reliability for data stored at the SLC than the other types of memory cells. However, since each SLC only stores a single bit of data, a memory device including SLCs will have a lower storage capacity when compared to a memory device having the same total number of memory cells, but including at least some MLCs, TLCs and/or QLCs, which store multiple bits of data per memory cell.

Although SLCs offer superior performance characteristics, manufacturing memory devices that include only SLC memory cells can be less cost-effective in comparison with memory devices having higher density cells (e.g., MLCs, TLCs and QLCs), which store more bits per cell. Accordingly, some memory cells can be configured as SLCs, while the rest of the memory cells can be higher density cells. Data is first written to the SLC portion of the memory device and later transferred to a higher density portion of the memory device when the memory sub-system is not busy servicing host requests. The use of SLC cells in this way can be termed a "SLC cache." The SLC cache provides a balance between the speed of SLC memory cells with the storage capacity of higher density memory cells. In some memory implementations, as the device fills up, memory cells configured as SLC cache are migrated to higher density memory cells to increase data storage capacity. The parameters under which the memory cells configured as SLC are migrated to higher density memory cells can be fixed at design time.

A memory device can operate in a SLC mode and program (write) every block of the memory device in SLC memory cells until memory device firmware runs out of free blocks to write to. Thus, physical saturation would occur at approximately 33% capacity of the logical saturation because all potential memory cells, which could have been programmed as TLC memory cells, are instead programmed as SLC memory cells. The firmware then switches from the SLC mode to a TLC mode and initiates garbage collection on all blocks written in SLC mode. Garbage collection is a process to recover free space by relocating pages with data to new blocks, and erasing old blocks. Specifically, a block can include valid data pages and data pages that are no longer needed (e.g., stale pages). Garbage collection generally involves copying only the valid data pages from a source block to a destination block and then erasing the source block to free the space. As a result, the number of blocks that have been erased can be increased such that more blocks are available to store subsequent data from a host system. This additional re-write of valid data in the data blocks during a garbage collection operation results in write amplification. Write amplification can reduce the operating life and impact performance of the memory sub-system. Thus, the garbage collection, when running concurrently with other operations of the memory device, can result in degraded performance of the memory device.

Over-provisioning refers to keeping above one the ratio of the physical capacity of a memory device and the logical capacity presented through the operating system as available to a host system. For example, over-provisioning can be measured by a number of excess valid blocks, memory pages, sub-blocks, half-blocks, or any other management units in a memory device. During manufacturing, each logical unit (LU) on a memory device can have a varying number of blocks that meet a minimum system requirement for use, referred to as "valid blocks." Blocks that don't meet the system requirement can be marked as "bad blocks," where none of the pages on a bad block are typically accessible. An LU at or near the system requirement of valid blocks can be categorized as "marginal." An LU with a surplus of valid blocks can be categorized as "extra healthy." Thus, a memory device can have a combination of extra healthy LUs and marginal LUs. Manufacturers generally determine a bad block distribution on a single LU of each memory device of a batch, and use that bad block distribution to estimate a bad block distribution for each entire memory device, which include different amounts of multiple LUs (e.g., 4 LUs, 8 LUs, 16 LUs, etc.). The SLC cache size can be confined by available over-provisioning. For example, the SLC cache size is fixed on each memory device based on the memory devices with the least amount of over-provisioning in the batch at an acceptable yield point (e.g., such that at least a certain percentage of the memory devices in the batch would have at least a certain number of valid blocks).

In some examples, the memory device firmware programs only blocks available from over-provisioning in SLC mode. Accordingly, the memory device firmware can program enough TLC blocks to write the entire capacity of the memory device without a need for garbage collection. In some examples, the memory device firmware programs more blocks in SLC mode than available from over-provisioning. Accordingly, the memory device firmware can engage in "light" garbage collection due to the amount of free blocks on the memory device. Light garbage collection can minimize performance degradation by running when the memory device is idle.

As such, memory devices typically do not operate at a full logical saturation, and the additional available memory (e.g., unused drive density in SDD) has been traditionally used for endurance improvement or performance improvement. For example, the additional available memory may be used to increase effective over-provisioning, leading to write amplification reduction, resulting in lesser device wearout through the life of device; alternatively, the additional available memory may be used in reduced bit-per-cell (e.g., converting to SLC mode), leading to faster write and read performance. However, the additional available memory has not been used for reliability and trigger rate improvement. Further, the additional available memory is not adaptively allocated to customer usage.

Aspects of the present disclosure address the above and other deficiencies by adjusting code rate based on logical saturation. Specifically, a memory sub-system can determine a logical saturation of a memory device (or a segment of the memory device). The memory sub-system can then adjust a code rate of the memory device based on the logical saturation, wherein the code rate represents a ratio of user data to a combination of the user data and error correction data. For example, a memory device has a logical saturation at 30%. The memory sub-system can then adjust the default code rate at 0.9, which is set at a full drive capacity, to a code rate at 0.83 corresponding to the logical saturation at 30%.

The adjustment of code rate based on the logical saturation can be performed according to a look-up table providing the code rate(s) as a function of the logical saturation(s). The adjustment of code rate can include code rate increase and code rate decrease. In some implementations, to decrease the code rate, the memory sub-system can designate an additional block(s) of the memory device to store the error correction data. In some implementations, to increase the code rate, the memory sub-system can undesignated the additional block(s) of the memory device for storing the error correction data.

In some implementations, the memory sub-system can determine whether to perform the code rate adjustment by determining whether the logical saturation satisfies a threshold/restore criterion. The threshold/restore criterion can represent a system requirement for a minimum amount of valid blocks required to accommodate certain logical capacity. The memory sub-system can then adjust a code rate of the memory device based on the logical saturation in response to the determination. For example, a memory device has a logical saturation at 30% and a surplus physical capacity at 50%, the threshold criterion requires 30% physical capacity for a 30% logical saturation. The memory sub-system can then determine that the logical saturation satisfies the threshold criterion. The memory sub-system can then reduce the default code rate at 0.9 to a code rate at 0.83 corresponding to the logical saturation at 30%. In another example, a memory device has a logical saturation at 100% and a surplus physical capacity at 5%, the restore criterion requires 90% physical capacity for a 100% logical saturation. The memory sub-system can then determine that the logical saturation satisfies the restore criterion. The memory sub-system can then increase the current code rate (e.g., 0.8) to the code rate at 0.9 corresponding to the logical saturation at 100%. In some implementations, the memory sub-system can determine to perform the code rate adjustment at a preset interval, by detecting a workload or environment change that satisfies a threshold, or by detecting an event occurs, for example, a new block is allocated for user data.

In some implementations, the memory sub-system can determine a surplus physical capacity (i.e., unused physical capacity) of the memory device, and allocate the surplus physical capacity to at least one of usages for dynamic cache, for effective over provisioning, or for adjusting the code rate. In some implementations, the memory sub-system can estimate write amplification penalty due to a decreased code rate, estimate write amplification saving due to effective over provisioning, and determine whether the write amplification saving exceeds the write amplification penalty. As such, unused physical capacity is strategically divided in between effective over-provisioning (garbage collection), code rate (reliability, trigger rates, performance), and dynamic cache (burst performance) serving multiple needs.

Advantages of the present disclosure include, but are not limited to, unused physical capacity can be used for reliability and trigger rate improvement. Specifically, when an ECC engine cannot recover a code word because of a larger raw bit error rate (RBER, which corresponds to a number of bit errors per unit of time that the data stored at the data block experiences), it forces the system into some error handling flow including multiple steps, causing performance penalty such as trigger rate penalty. As the code rate reduces, the system error correction capability increases, including the improvement of the hard correction (the capability of a hard decoder that actually decodes the code word), leading to trigger rate improvement. Also, reliability is the data integrity requirement imposed by the customer, commonly specified by uncorrectable bit error rate (UBER). As the code rate reduces, the system error correction capability increases, including the improvement of the soft correction (when a hard decoder is not fast enough to decode the code word, a soft decoder uses multiple bits to decode a larger RBER for a faster performance), resulting in reliability improvement.

The present disclosure also provides an adaptive method for a specific customer's usage. Specifically, by allowing of allocating the surplus physical capacity to at least one of usages for dynamic cache, for effective over provisioning, or for adjusting the code rate, the memory device experiences improved performance and energy consumption that is customized to the device. Having a variable ECC feature (by adjusting code rate) provides an advantage of managing the physical space more efficiently in the field. Adding/deleting the extra ECC independently in a separate block(s)/layer(s) without affecting user data block avoids the need for garbage collecting user data blocks. For example, the present disclosure may enable different sizes of reliability partition as a function of logic saturation, because larger ECC correction capability allows more liberty to speed the tPROG/tR, improve the performance and energy per efficiency, and allows the NAND to operate in a faster and noise environment.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access the memory devices (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in-place memory, such as three-dimensional cross-point ("3D cross-point") memory. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLCs) can store one bit per cell. Other types of memory cells, such as multi-level cells (MLCs), triple level cells (TLCs), quad-level (QLCs), and penta-level cells (PLCs) cells, can store multiple bits per cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion and a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory devices such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor 117 (e.g., a processing device) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

A portion of the memory device 130 and/or 140 can be reserved for an SLC cache. SLC caching stores incoming host data in SLC memory cells prior to being written to higher density memory cell (e.g., MLC, TLC, QLC, etc.). Data caching is performed to avoid loss of data and/or to minimize an amount of time for data received from the host system 120 to be programmed to memory device 130 and/or 140. For example, the memory sub-system 110 can receive host data to be stored in MLC memory cells, and initially stores the host data in SLC memory cells, which have a faster write time. The memory sub-system 110 then copies the host data from the SLC memory cells to MLC memory cells. The potential loss of data resulting from power loss during the write operation to the MLC memory cells is avoided because all of the data stored in the SLC memory cells can be retrieved after power is restored. Once data is transferred from a block of the SLC cache to a higher density memory cell, the block can be invalidated, and a garbage collection operation can be performed to erase the data on the block, thereby allowing the block to be programmed with new data.

The memory sub-system 110 includes a code rate management component 113 that can determine a logical saturation of a memory device in a memory sub-system and adjust a code rate of the memory device based on the logical saturation, wherein the code rate represents a ratio of user data to a combination of the user data and error correction data.

The code rate management component 113 can adjust the code rate by designating an additional block of the memory device to store the error correction data in order to decrease the code rate, and/or undesignating the additional block of the memory device for storing the error correction data in order to increase the code rate. The code rate management component 113 can adjust the code rate according to a look-up table providing the code rate as a function of the logical saturation. The code rate can be as a fixed value during manufacturing, testing, or calibration of the memory-subsystem 110 (e.g., prior to shipment to an end user), and the code rate management component 113 can dynamically change or update the code rate during the lifetime of the memory sub-system 110. The code rate management component 113 can monitor the logical saturation for the purpose of code rate adjustment. Further details with regards to the operations of the code rate management component 113 are described below.

Figure 2:
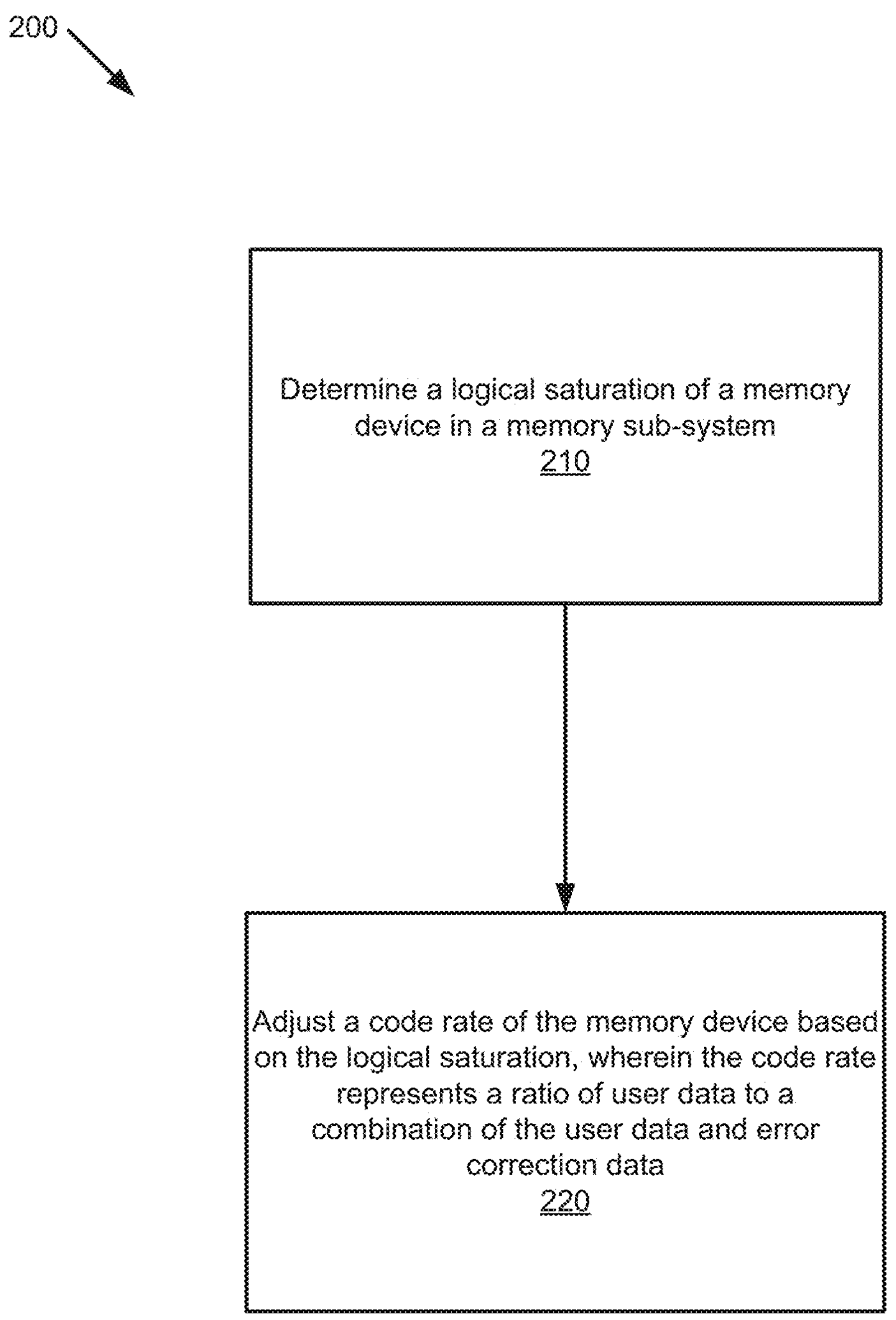
FIGS. 2-4 are flow diagrams of example methods to adjust a code rate based on a logical saturation in accordance with some embodiments of the present disclosure.
Figure 3:
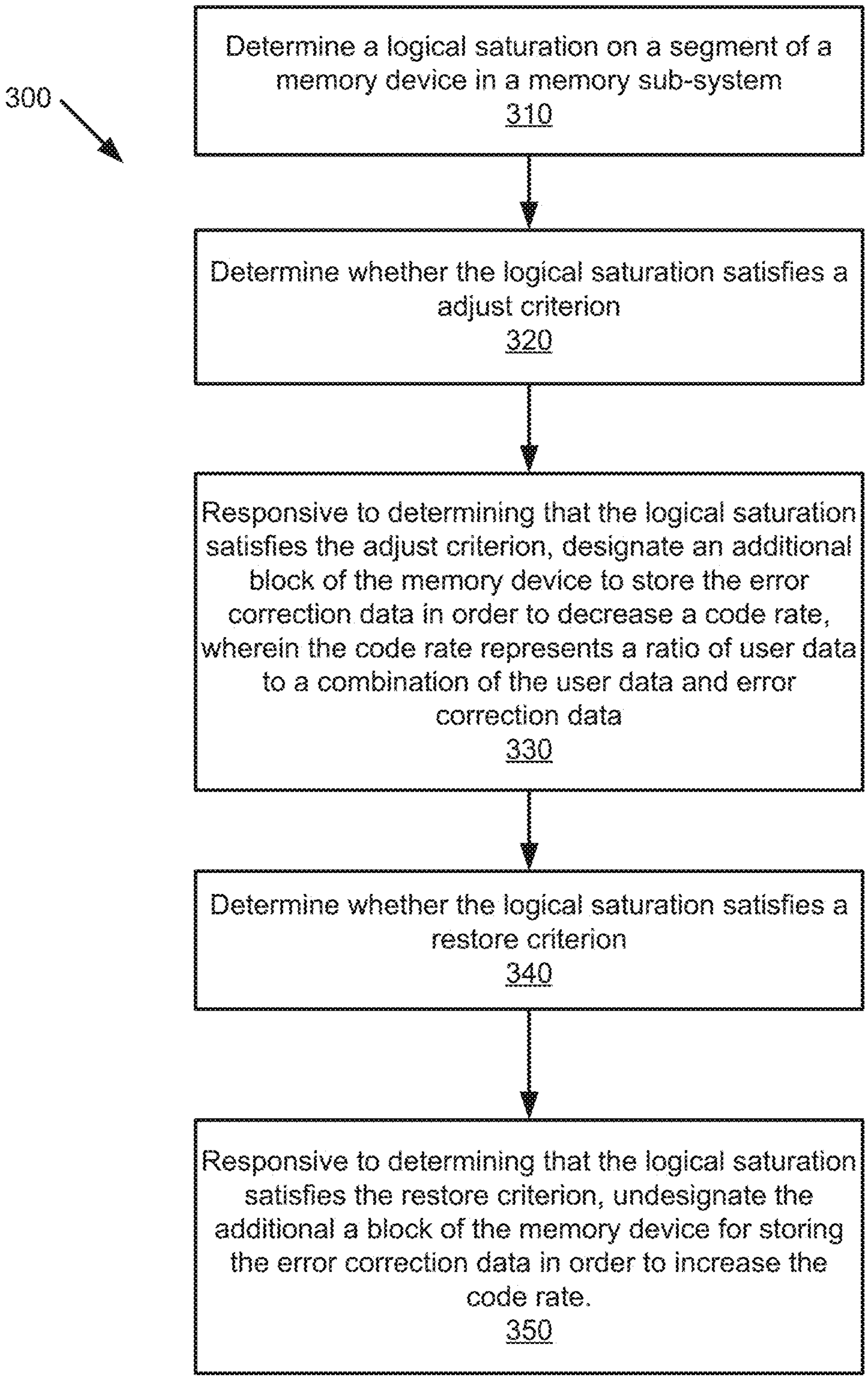
Figure 4:
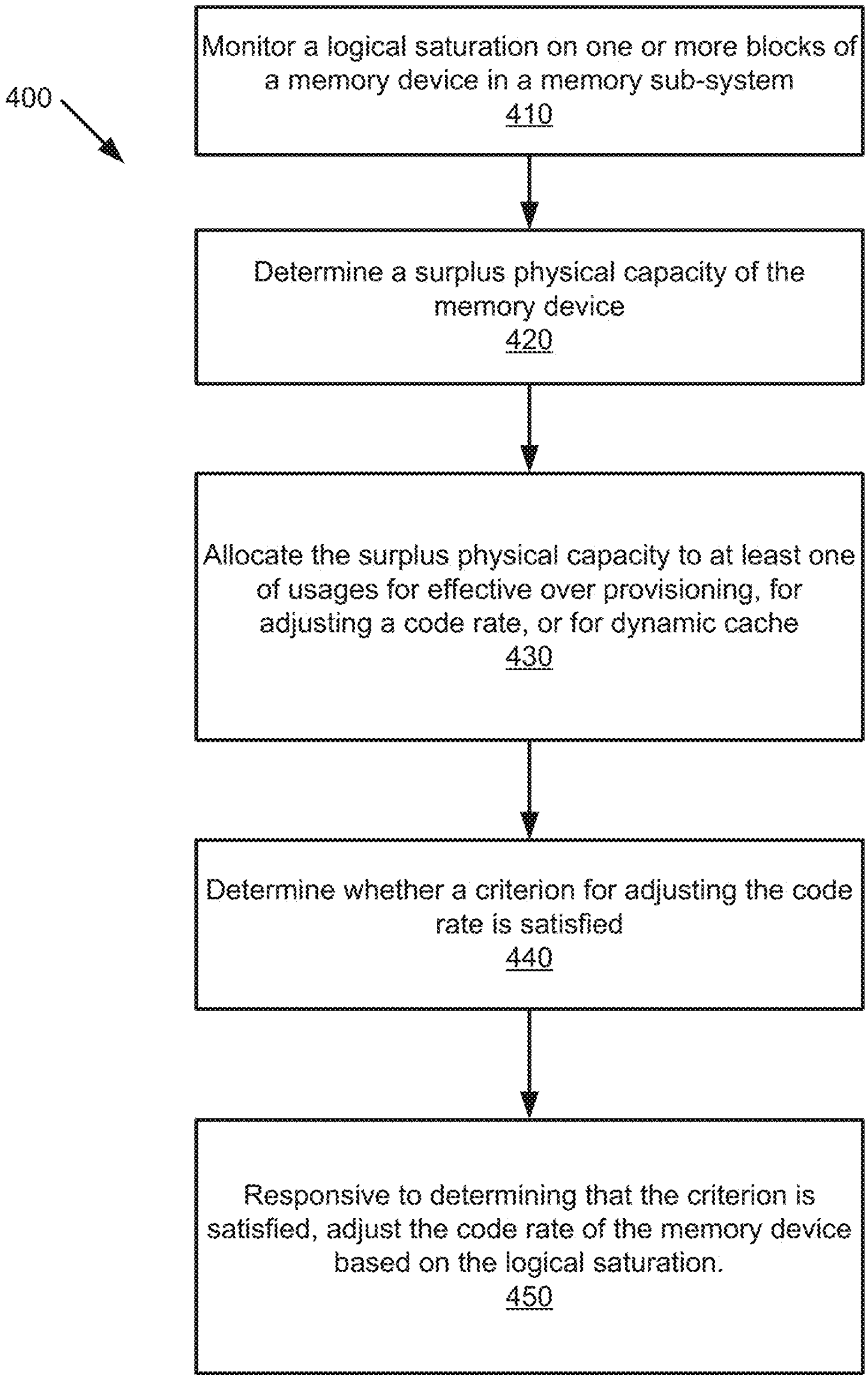

FIGS. 2-4 are flow diagrams of example methods to adjust a code rate based on a logical saturation, in accordance with some embodiments of the present disclosure. The methods 200-400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the methods 200-400 are performed by the code rate management component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

The methods 200-400 are described using blocks. It is noted that blocks are used by way of example, and that any management unit can be used in place of the blocks, such as memory pages, sub-blocks, half-blocks, etc. A half-block can include half of the memory pages of a block. A sub-block can include any portion of memory pages of a block. For example, the term "management unit" may be used to indicate that a code rate is calculated, determined, or adjusted specific to the management unit.

Referring to FIG. 2, at operation 210, the processing logic determines a logical saturation of a memory device. For example, the processing logic may determine the logical saturation by calculating a ratio of the logical capacity being used to the full logical capacity of a memory device. The logical saturation may be represented by a percentage value.

In some implementations, the processing logic may obtain or determine the full logical capacity for a management unit including one or more blocks of a memory device. In one example, the processing logic can set the full logical capacity as a fixed size during manufacturing, testing, or calibration of the memory-subsystem 110 (e.g., prior to shipment to an end user). In some implementations, the processing logic may calculate or determine the logical capacity represented by the amount of valid data within the management unit that are being used.

In some implementations, the processing logic may determine whether to perform a code rate adjustment by various criteria. For example, the processing logic may determine to perform the code rate adjustment every per-defined interval. In another example, the processing logic may determine to perform the code rate adjustment when a change to workload or environment over a threshold is detected. In another example, the processing logic may determine to perform the code rate adjustment when an event, such as a new block is allocated for user data, is detected. In another example, the processing logical may determine whether to perform the code rate adjustment by determining whether the logical saturation satisfies a threshold criterion. For example, the processing logic may compare the logical saturation with the threshold criterion. The threshold criterion can represent a system requirement for a minimum amount of valid blocks required to accommodate certain logical capacity. In some implementations, the threshold criterion may be a percentage value, and the processing logic may determine that logical saturation satisfies the threshold criterion when the percentage value of the logical saturation exceeds or meets the percentage value of the threshold criterion. In some implementations, the threshold criterion may be a range of percentage values, and the processing logic may determine that logical saturation satisfies the threshold criterion when the percentage value of the logical saturation falls in the range of percentage values of the threshold criterion. Other criteria are described with respect to FIGS. 3-4.

At operation 220, the processing logic adjusts a code rate of the memory device based on the logical saturation, wherein the code rate represents a ratio of user data to a combination of the user data and error correction data. The code rate may be configured at full drive capacity and have a default value, and adjustment of the code rate can increase or decrease the default value of the code rate. In one example, the processing logic can set the code rate as a fixed value during manufacturing, testing, or calibration of the memory-subsystem 110 (e.g., prior to shipment to an end user), and then the processing logic can dynamically change or update the code rate during the lifetime of the memory sub-system 110. In yet another example, the code rate can be updated by the host system 120. For example, the controller 115 can receive commands or operations from the host system 120 indicating one or more of an updated code rate.

The adjustment of the code rate can be based on the logical saturation. The code rate can be a function of the logical saturation. For example, the function may be a linear relationship between code rate and logical saturation. In some implementations, a look-up table may be provided including the logical saturation and the corresponding code rate. In one example, the look-up table may provide a value of the logical saturation corresponding to a value of the code rate, for example, 50% logical saturation corresponding to 0.85 code rate. In another example, the look-up table may provide a range of the logical saturation (i.e., any value falls within the range) corresponding to a value of the code rate, for example, 40%-60% logical saturation corresponding to 0.85 code rate, in which case that when the value of the logical saturation falls in 40%-60%, the code rate can be adjusted to 0.85. In another example, the look-up table may provide a value of the logical saturation corresponding to a range of the code rate (i.e., any value falls within the range), for example, 50% logical saturation corresponding to 0.84-0.86 code rate, in which case that when the value of the logical saturation is 50%, the code rate can be adjusted to any value falls within 0.84-0.86. In another example, the look-up table may provide a range of the logical saturation corresponding to a range of the code rate, for example, 40%-60% logical saturation corresponding to 0.84-0.86 code rate, in which case that when the logical saturation falls in 40%-60%, the code rate can be adjusted to any value falls within 0.84-0.86.

In some implementations, the processing logic may reduce the code rate by adding extra block(s) designated for ECC usage, that is, designating these blocks for extra ECC use. For example, a memory device (or any segment of the memory device) includes ten blocks, in default, nine blocks of the memory device is used for storing user data, and one block of the memory device is used for ECC, then the code rate for the memory device has a value of 0.9 (e.g., a ratio of nine blocks (i.e., user data blocks) to a combination of nine blocks (i.e., user data blocks) and one block (i.e., ECC block)); then one extra block is added for use as ECC, which leads to the code rate reduced to a value of 9/11=0.82 (e.g., a ratio of nine blocks (i.e., user data blocks) to a combination of nine blocks (i.e., user data blocks) and two blocks (i.e., ECC blocks)). In some implementations, the extra block(s) designated for ECC usage can be marked as a separate layer that distinguishes from the block used as ECC in default. In some implementations, a separate layer that includes all extra block(s) designated for ECC usage can be used for distinguishing from a layer that includes all block(s) used as ECC in default. As the host writes more data but maintains same logical saturation (i.e., drive over-writes LBAs), the physical allocation for garbage collection over-provisioning, performance SLC buffer and over-provisioning spent on extra layer of ECC is maintained at equilibrium.

In some implementations, the processing logic may increase the code rate by deleting all or some of the extra blocks designated for ECC usage, that is, freeing these blocks for other tasks or purposes. In some implementations, the processing logic may increase the code rate by choosing some block(s) in the separate layer designated for extra ECC usage and un-designating the chosen blocks so that these blocks will not be used for extra ECC purpose. In some implementations, increasing the code rate may put the code rate back into its default value. For example, a memory device (or any segment of the memory device) includes ten blocks, nine blocks of the memory device is used for storing user data, one block of the memory device is used for ECC, and one extra block has been added for use as ECC, and then the extra block is deleted or un-designated, which leads to the code rate reduced from a value of 9/11=0.82 (e.g., a ratio of nine blocks (i.e., user data blocks) to a combination of nine blocks (i.e., user data blocks) and two blocks (i.e., ECC blocks)) to a value of 0.9 (e.g., a ratio of nine blocks (i.e., user data blocks) to a combination of nine blocks (i.e., user data blocks) and one block (i.e., ECC block)). In some implementations, increasing the code rate may still provide a code rate smaller than its default value. For example, the memory device contains nine user data blocks, one default ECC block, and two extra ECC blocks, which has the value of the code rate as 9/12=0.75, then one extra ECC block is deleted or un-designated, leading to the code rate becoming 9/11=0.82, which is smaller than the default value 0.9. As the host writes that increases the logic saturation, the physical budget to the extra ECC is reduced, so by deleting the extra ECC blocks/layers, garbage collection on the user data blocks can be avoided.

In some implementations, adjusting the code rate may be performed responsive to a determination to perform the code rate adjustment, including the threshold criterion, the adjust criterion, the restore criterion, and/or the criterion for adjusting the code rate described with respect to FIGS. 2-4.

Referring to FIG. 3, at operation 310, the processing logic may determine a logical saturation on a segment of a memory device in a memory sub-system, which may be same as or similar to operation 210.

At operation 320, the processing logic may determine whether the logical saturation satisfies an adjust criterion. In some implementations, the adjust criterion may be the same as the threshold criterion described with respect to FIG. 2. In some implementations, the adjust criterion may represent a requirement for a change of the code rate. For example, the adjust criterion may be a range of percentage values, and the processing logic may determine that logical saturation satisfies the adjust criterion when the percentage value of the logical saturation falls in the range of the adjust criterion. In another example, the adjust criterion may include multiple ranges of percentage values, and the processing logic may determine that logical saturation satisfies the adjust criterion when the percentage value of the logical saturation falls in any range of the adjust criterion.

At operation 330, responsive to determining that the logical saturation satisfies the adjust criterion, the processing logic may designate an additional block of the memory device to store the error correction data in order to decrease a code rate, which may be same as or similar to part of operation 230.

At operation 340, the processing logic may determine the logical saturation satisfies a restore criterion. For example, the processing logic may compare the logical saturation with the restore criterion. In some implementations, the restore criterion may represent a system requirement for a minimum amount of valid blocks required to accommodate certain logical capacity, and the restore criterion may be same as the threshold criterion described with respect to FIG. 2 but would lead the opposite (e.g., adding/deleting) operations regarding the extra ECC blocks. For example, the restore criterion may be a percentage value, and the processing logic may determine that logical saturation satisfies the restore criterion when the percentage value of the logical saturation is equal to or lower than the percentage value of the restore criterion. In some implementations, the restore criterion may represent a requirement for restoring the code rate. For example, the restore criterion may be a range of percentage values, and the processing logic may determine that logical saturation satisfies the restore criterion when the percentage value of the logical saturation falls in the range of the restore criterion. In another example, the adjust criterion may include multiple ranges of percentage values, and the processing logic may determine that logical saturation satisfies the restore criterion when the percentage value of the logical saturation falls in any range of the restore criterion.

At operation 350, responsive to determining that the logical saturation satisfies the restore criterion, the processing logic may un-designate the additional block of the memory device for storing the error correction data in order to increase the code rate, which may be same as or similar to part of operation 230.

It is noted that although one level of designating and un-designating are described here, multi-levels of designating and un-designating may be included in the methods according to the present disclosure. The multi-levels of designating and un-designating may provide an indication of the order to add/delete the extra EEC blocks. For example, the extra ECC blocks designated first may be represented as blocks at a first level of designating, the extra ECC blocks un-designated first may be represented as blocks at a first level of un-designating, and the blocks at a first level of designating and the blocks at a first level of un-designating may be the same blocks, but can also be different to each other.

Referring to FIG. 4, at operation 410, the processing logic may monitor a logical saturation on one or more blocks of a memory device in a memory sub-system. The processing logic may monitor the logical saturation at pre-defined intervals or upon detecting a workload or environment change that exceeds a threshold (e.g., when a super block is open). In some implementations, the processing logic may determine the logical saturation of a memory device in a memory sub-system, which may be same as or similar to operation 210.

At operation 420, the processing logic may determine a surplus physical capacity of the memory device. In some implementations, unused valid blocks above the system requirement minimum are calculated as surplus physical capacity. In some implementations, the unused valid blocks and the blocks used as over provisioning together are calculated as surplus physical capacity.

In some implementations, the processing logical may estimate write amplification penalty due to a decreased code rate, estimate write amplification saving due to effective over provisioning, and determine whether the write amplification saving exceeds the write amplification penalty. For example, the processing logical may calculate write amplification penalty due to smaller code rate that is about to be implemented, as a smaller code rate means lesser user data payload, leading to increase of Program/Erase cycle per unit of data. The processing logical may calculate the write amplification savings due to effective over-provisioning, for example, either from garbage collection entropy of valid data distribution or pre-characterized write amplification based on over-provisioning. It is noted for most cases the write amplification saving would exceed the write amplification penalty, but the processing logic may still check whether the write amplification saving exceeds the write amplification penalty before performing code rate adjustment. Thus, adjusting the code rate may be performed responsive to determining that the write amplification saving exceeds the write amplification penalty At operation 430, the processing logic may allocate the surplus physical capacity to at least one of usages for dynamic cache, for effective over provisioning, or for adjusting a code rate.

The processing logic may allocate the surplus physical capacity for the usage of dynamic cache. The cache size and content stored in cache can vary during usage since the density of memory cells can be reconfigurable by firmware. In memory devices featuring dynamic-size SLC caches, the cache size is typically varied based upon how full the memory device is. For example, the cache size can be configured using all of the surplus valid blocks (e.g., if there are 100 surplus valid blocks, the cache size is configured using 100 valid blocks). In another example, the cache size can be configured using a portion of the surplus valid blocks. The portion can be based on a percentage of the surplus valid blocks, a fixed amount of the surplus valid blocks, etc. As such, each of a plurality of memory devices can have part of surplus physical capacity used as caches.

The processing logic may allocate the surplus physical capacity for the usage of over-provisioning. The surplus physical capacity may be configured as sources of over-provisioning in addition to other sources of over-provisioning. Specifically, free space can be identified by an operating system using a command, which allows an operating system to inform the memory device which blocks are no longer considered in use and can be wiped internally. As stored user data changes, the free space is used automatically as over-provisioning. Alternatively, some memory devices provide a utility that permits a user of the host system to select additional over-provisioning. Furthermore, if any memory device is set up with an overall partitioning layout smaller than 100% of the available space, that unpartitioned space can be automatically used by the memory device as over-provisioning as well. This source of over-provisioning can take away from user capacity, either temporarily or permanently, but it gives back reduced write amplification, increased endurance, and increased performance.

The processing logic may allocate the surplus physical capacity for the usage of code rate adjustment as described below.

At operation 440, the processing logic may determine whether a criterion for adjusting the code rate is satisfied. In some implementations, the processing logic may use various criteria for adjusting the code rate. For example, the processing logic may determine to perform the code rate adjustment at every per-defined interval, and thus the criterion is satisfied at every per-defined interval. In another example, the processing logic may determine to perform the code rate adjustment when a change to workload or environment over a threshold is detected, and thus the criterion is satisfied when a change to workload or environment over a threshold is detected. In another example, the processing logical may determine whether the criterion for adjusting the code rate is satisfied by determining whether the logical saturation satisfies a threshold/adjust or restore criterion.

In some implementations, the memory sub-system may determine whether the logical saturation satisfies a threshold/adjust criterion. The threshold/adjust criterion can represent a system requirement for a minimum amount of valid blocks required to accommodate certain logical capacity. The logical saturation satisfies the threshold/adjust criterion when a surplus physical capacity of the memory device at the logical saturation meets or exceeds a minimum physical capacity of the memory device. The memory sub-system can then adjust a code rate of the memory device based on the logical saturation in response to the determination. For example, a memory device has a logical saturation at 30%, the surplus physical capacity can be calculated, the threshold criterion requires 30% physical capacity for a 30% logical saturation, and the memory sub-system can determine that the logical saturation satisfies the threshold criterion.

In some implementations, the memory sub-system may determine whether the logical saturation satisfies a restore criterion. The restore criterion can represent a system requirement for a minimum amount of valid blocks required to accommodate certain logical capacity. The logical saturation satisfies the restore criterion when a surplus physical capacity of the memory device at the logical saturation does not meet a minimum physical capacity of the memory device. The memory sub-system can then adjust a code rate of the memory device based on the logical saturation in response to the determination. For example, a memory device has a logical saturation at 100% and a surplus physical capacity at 5%, the restore criterion requires 90% physical capacity for a 100% logical saturation, and the memory sub-system can then determine that the logical saturation satisfies the restore criterion.

At operation 450, responsive to determining that the criterion is satisfied, the processing logic may adjust the code rate of the memory device based on the logical saturation, which may be same as or similar to operation 220.

Figure 5A:
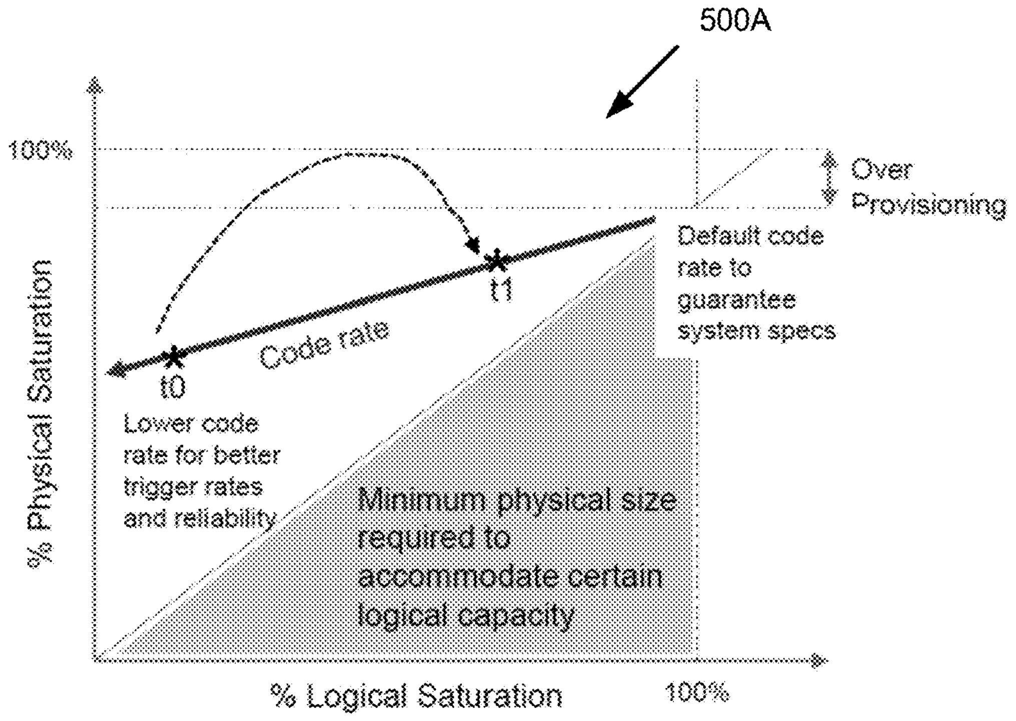
FIGS. 5A and 5B are illustrations of adjusting a code rate based on logical saturation in accordance with some embodiments of present disclosure.
Figure 5B:
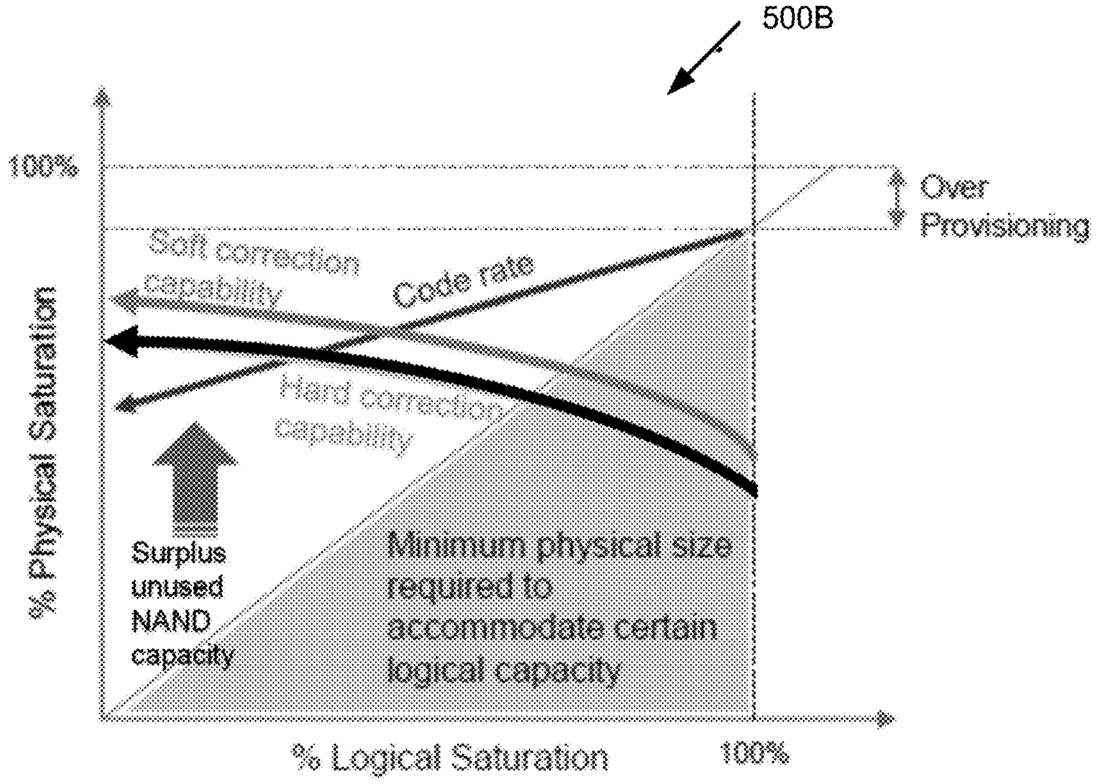

FIGS. 5A and 5B are illustrations of adjusting a code rate based on logical saturation in accordance with some embodiments of present disclosure. Referring to FIG. 5A, a graph of physical capacity (or physical saturation) and the logical saturation is illustrated. There is a minimum physical capacity requirement to accommodate certain logical capacity. For physical capacity over the corresponding logical saturation threshold, code rate can be adjusted. For example, as illustrated in FIG. 5A, the code rate may have a default value determined at the full (100%) logical saturation. The code rate may be adjusted following the code rate line based on the logical saturation. For example, based on the determined logical saturation, the code rate may be reduced to t1 and/or t0. The lower code rate may lead to a better trigger rates and reliability. In another example, based on the determined logical saturation, the code rate may be increased from t0 to t1, which may give back blocks for additional workload when the logical saturation increases.

Referring to FIG. 5B, a graph of physical capacity (or physical saturation) and the logical saturation is illustrated and there is also a minimum physical capacity requirement to accommodate certain logical capacity. The surplus unused physical capacity is calculated for each logical saturation and may be used for reducing the code rate. As the code rate reduces, the system may have increased error correction capability, which may include increased hard correction capability (e.g., the capability of a hard decoder actually decodes) and increased soft correction capability (e.g., the capability of a soft decoder uses multiple bits to decode a larger RBER), leading to a faster performance.

Figure 6:
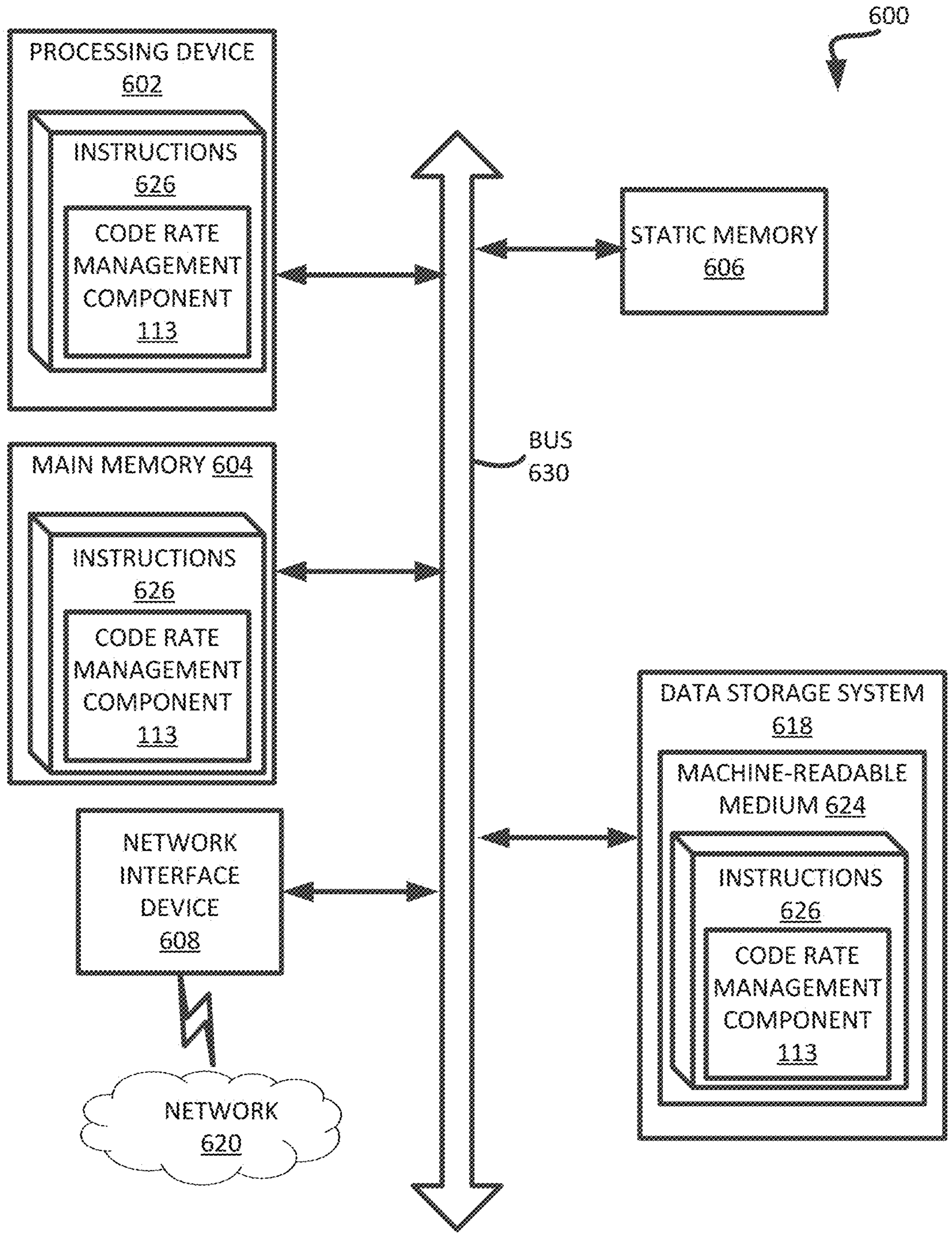
FIG. 6 is a block diagram of an example computer system in which implementations of the present disclosure can operate.

FIG. 6 illustrates an example machine of a computer system 600 within which a set of instructions, for causing the machine to perform any one or more of the methodologies discussed herein, can be executed. In some embodiments, the computer system 600 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the code rate management component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage system 618, which communicate with each other via a bus 630.

Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 608 to communicate over the network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 110 of FIG. 1.

In one embodiment, the instructions 626 include instructions to implement functionality corresponding to a data relocation component (e.g., the code rate management component 113 of FIG. 1). While the machine-readable storage medium 624 is shown For example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:

determining whether a logical saturation of a memory device in a memory sub-system satisfies an adjust criterion; and directly responsive to determining that the logical saturation satisfies the adjust criterion, designating an additional block of the memory device to store error correction data.

2. The method of claim 1, wherein the adjust criterion represents a system requirement for a minimum amount of valid blocks required to accommodate a certain logical storage capacity.

3. The method of claim 1, wherein designating the additional block of the memory device to store the error correction data decreases a code rate of the memory device.

4. The method of claim 3, wherein the code rate of the memory device represents a ratio of user data to a combination of the user data and the error correction data.

5. The method of claim 1, further comprising:

determining whether the logical saturation satisfies a restore criterion; and responsive to determining that the logical saturation satisfies the restore criterion, undesignating the additional block of the memory device for storing the error correction data.

6. The method of claim 5, wherein the logical saturation satisfies the restore criterion when a surplus physical capacity of the memory device at the logical saturation does not meet a minimum physical capacity of the memory device.

7. The method of claim 5, wherein undesignating the additional block of the memory device for storing the error correction data increases a code rate of the memory device.

8. A system comprising:

a memory device; and a processing device, operatively coupled with the memory device, to perform operations comprising:

determining whether a logical saturation of the memory device satisfies an adjust criterion; and directly responsive to determining that the logical saturation satisfies the adjust criterion, designating an additional block of the memory device to store error correction data.

9. The system of claim 8, wherein the adjust criterion represents a system requirement for a minimum amount of valid blocks required to accommodate a certain logical storage capacity.

10. The system of claim 8, wherein designating the additional block of the memory device to store the error correction data decreases a code rate of the memory device.

11. The system of claim 10, wherein the code rate of the memory device represents a ratio of user data to a combination of the user data and the error correction data.

12. The system of claim 8, wherein the processing device is to perform operations further comprising:

determining whether the logical saturation satisfies a restore criterion; and responsive to determining that the logical saturation satisfies the restore criterion, undesignating the additional block of the memory device for storing the error correction data.

13. The system of claim 12, wherein the logical saturation satisfies the restore criterion when a surplus physical capacity of the memory device at the logical saturation does not meet a minimum physical capacity of the memory device.

14. The system of claim 12, wherein undesignating the additional block of the memory device for storing the error correction data increases a code rate of the memory device.

15. A non-transitory computer-readable storage medium comprising instructions that, when executed by a processing device, cause the processing device to perform operations, comprising:

determining whether a logical saturation of a memory device in a memory sub-system satisfies an adjust criterion; and directly responsive to determining that the logical saturation satisfies the adjust criterion, designating an additional block of the memory device to store error correction data.

16. The non-transitory computer-readable storage medium of claim 15, wherein the adjust criterion represents a system requirement for a minimum amount of valid blocks required to accommodate a certain logical storage capacity.

17. The non-transitory computer-readable storage medium of claim 15, wherein designating the additional block of the memory device to store the error correction data decreases a code rate of the memory device.

18. The non-transitory computer-readable storage medium of claim 17, wherein the code rate of the memory device represents a ratio of user data to a combination of the user data and the error correction data.

19. The non-transitory computer-readable storage medium of claim 15, wherein the instructions cause the processing device to perform operations further comprising:

determining whether the logical saturation satisfies a restore criterion; and responsive to determining that the logical saturation satisfies the restore criterion, undesignating the additional block of the memory device for storing the error correction data to increase a code rate of the memory device.

20. The non-transitory computer-readable storage medium of claim 19, wherein the logical saturation satisfies the restore criterion when a surplus physical capacity of the memory device at the logical saturation does not meet a minimum physical capacity of the memory device.

* * * * *